United States Patent
Aoki et al.

(10) Patent No.: US 11,952,032 B2
(45) Date of Patent: Apr. 9, 2024

(54) STEERING WHEEL WITH DISPLAY AND LIGHT SOURCE

(71) Applicant: HONDA MOTOR CO., LTD., Tokyo (JP)

(72) Inventors: Yuki Aoki, Saitama (JP); Yosuke Shimizu, Saitama (JP); Takeyuki Suzuki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 150 days.

(21) Appl. No.: 17/432,689

(22) PCT Filed: Feb. 27, 2019

(86) PCT No.: PCT/JP2019/007592
§ 371 (c)(1),
(2) Date: Aug. 20, 2021

(87) PCT Pub. No.: WO2020/174614
PCT Pub. Date: Sep. 3, 2020

(65) Prior Publication Data
US 2022/0169298 A1 Jun. 2, 2022

(51) Int. Cl.
*B62D 1/04* (2006.01)
*B60R 11/02* (2006.01)
(Continued)

(52) U.S. Cl.
CPC .......... *B62D 1/046* (2013.01); *B60R 11/0229* (2013.01); *G06F 3/041* (2013.01); *G06F 3/14* (2013.01)

(58) Field of Classification Search
CPC ..... B62D 1/046; B62D 1/105; B60R 11/0229; B60R 16/027; G06F 3/041; G06F 3/14;
(Continued)

(56) References Cited

U.S. PATENT DOCUMENTS

| | | | |
|---|---|---|---|
| 2009/0189373 A1* | 7/2009 | Schramm | B60R 11/0264 280/731 |
| 2013/0106693 A1* | 5/2013 | Okuyama | G06F 3/0482 345/157 |

(Continued)

FOREIGN PATENT DOCUMENTS

| | | |
|---|---|---|
| JP | H0413175 A | 1/1992 |
| JP | H0457087 A | 2/1992 |

(Continued)

OTHER PUBLICATIONS

1 Notice of Reasons for Refusal for Patent Application JP 2021-501459 dated Jun. 14, 2022; 10 pp.

(Continued)

*Primary Examiner* — David D Davis
(74) *Attorney, Agent, or Firm* — Armstrong Teasdale LLP

(57) ABSTRACT

To display information appropriately without making an occupant feel annoyed, a steering operation element 10 of a vehicle 2 includes a hub part 31 provided rotatably with respect to a vehicle body 15; an extending part 32 extending radially outward from an outer circumference of the hub part; an outer edge part 33 provided on an outer edge of the extending part; a display 40 provided on the hub part; at least one first light source 27A provided on the extending part; and an interface control device 41 configured to control the display and the first light source, wherein the interface control device is configured to cause the display to display an image corresponding to at least one of vehicle state information indicating a state of the vehicle and environment information indicating a surrounding environment of the vehicle.

1 Claim, 12 Drawing Sheets

Figure 1:
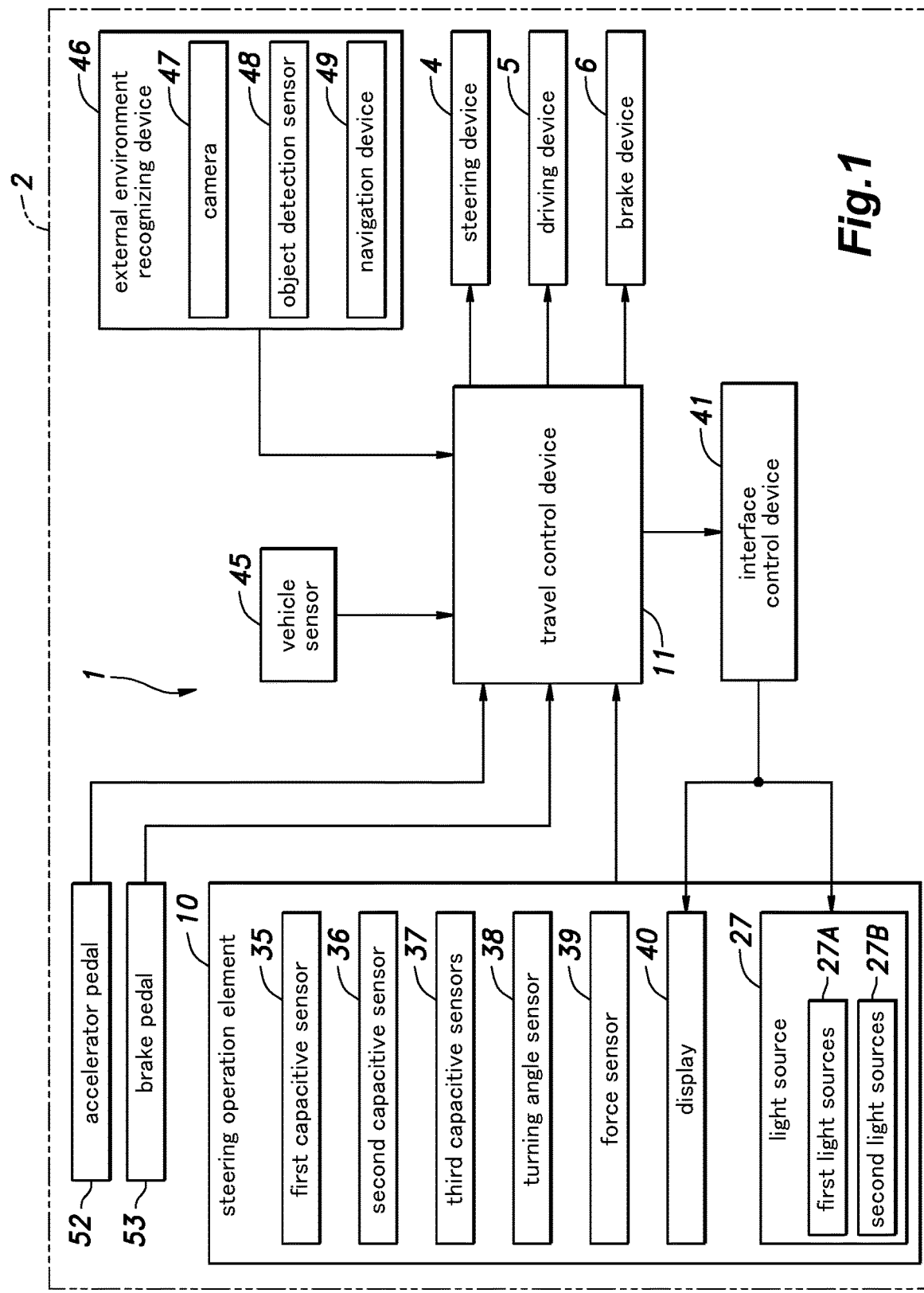

(51) Int. Cl.
*G06F 3/041* (2006.01)
*G06F 3/14* (2006.01)

(58) Field of Classification Search
CPC ........ B60K 2370/172; B60K 2370/175; B60K 2370/188; B60K 2370/332; B60K 2370/782; B60K 37/04; B60K 35/00; G09G 2380/10
See application file for complete search history.

(56) References Cited

U.S. PATENT DOCUMENTS

| | | | | |
|---|---|---|---|---|
| 2014/0082565 | A1* | 3/2014 | Suzuki | H01H 25/04 |
| | | | | 715/835 |
| 2014/0107888 | A1 | 4/2014 | Quast et al. | |
| 2014/0244070 | A1* | 8/2014 | Inagaki | B62D 15/0285 |
| | | | | 701/1 |
| 2014/0244115 | A1* | 8/2014 | Sanma | B60K 35/00 |
| | | | | 701/42 |
| 2016/0039457 | A1 | 2/2016 | Klank et al. | |
| 2016/0207489 | A1* | 7/2016 | Honmatsu | B62D 1/046 |
| 2016/0291862 | A1* | 10/2016 | Yaron | G06F 3/04883 |
| 2017/0151906 | A1 | 6/2017 | Sakuma | |
| 2018/0290666 | A1 | 10/2018 | Ichikawa et al. | |
| 2018/0370556 | A1* | 12/2018 | Nakano | B62D 1/105 |
| 2019/0009676 | A1* | 1/2019 | Yokota | B60K 35/00 |
| 2019/0011042 | A1* | 1/2019 | Fribus | B60K 35/00 |
| 2019/0276050 | A1 | 9/2019 | Mega et al. | |
| 2023/0103518 | A1* | 4/2023 | Rogers | G06F 21/602 |
| | | | | 726/26 |

FOREIGN PATENT DOCUMENTS

| | | |
|---|---|---|
| JP | 2013079061 A | 5/2013 |
| JP | 2013089245 A | 5/2013 |
| JP | 2014164466 A | 9/2014 |
| JP | 2014166834 A | 9/2014 |
| JP | 2018083523 A | 5/2018 |
| JP | 2018176935 A | 11/2018 |
| WO | 2015145674 A1 | 10/2015 |
| WO | 2018092230 A1 | 5/2018 |
| WO | WO-2018172886 A1 * 9/2018 ............. B60K 35/00 |  |

OTHER PUBLICATIONS

English translation of International Search Report for PCT Application PCT/JP2019/007592 dated Apr. 23, 2019; 2 pp.

* cited by examiner door open time stopped time autonomous driving time manual driving time

STEERING WHEEL WITH DISPLAY AND LIGHT SOURCE

CROSS-REFERENCE TO RELATED APPLICATION

This application is a U.S. National Phase Application of PCT/JP2019/007592 filed Feb. 27, 2019. The contents of this application are hereby expressly incorporated by reference in their entirety.

TECHNICAL FIELD

The present invention relates to a steering operation element of a vehicle.

BACKGROUND ART

As a steering wheel of an autonomous vehicle, there is a steering wheel including a ring part provided with a display part such as a liquid crystal monitor (for example, Patent Document 1). This steering wheel causes the display part to display a steering angle image that moves in the circumferential direction according to a steering angle, thereby making the occupant recognize the steering angle. Further, there is a steering wheel including a ring part provided with light emitting elements (for example, Patent Document 2). This steering wheel causes the light emitting elements to emit light in order in the steering direction, thereby displaying the future trajectory of the vehicle. Further, this steering wheel changes the color of the emitted light according to the magnitude of the yaw rate and lateral acceleration.

PRIOR ART DOCUMENT(S)

Patent Document(s)

Patent Document 1: JP2018-83523A
Patent Document 2: WO2015/145674A

SUMMARY OF THE INVENTION

Task to be Accomplished by the Invention

While the occupant (driver) is monitoring the front of the vehicle, if the light emitting elements provided on the ring part emit light according to the behavior of the vehicle, the light flickers at the bottom of the occupant's view, which may make the occupant feel annoyed.

In view of the above background, an object of the present invention is to display information appropriately in a steering operation element of a vehicle without making the occupant feel annoyed.

Means for Accomplishing the Task

To achieve such an object, one aspect of the present invention provides a steering operation element (10) of a vehicle (2), including: a hub part (31) provided rotatably with respect to a vehicle body (15); an extending part (32) extending radially outward from an outer circumference of the hub part; an outer edge part (33) provided on an outer edge of the extending part; a display (40) provided on the hub part; at least one first light source (27A) provided on the extending part; and an interface control device (41) configured to control the display and the first light source, wherein the interface control device is configured to cause the display to display an image corresponding to at least one of vehicle state information indicating a state of the vehicle and environment information indicating a surrounding environment of the vehicle.

According to this aspect, the first light source is provided not on the outer edge part but on the extending part inside the outer edge part, so that it is possible to prevent the light from the first light source from making the occupant feel annoyed. Further, the display provided on the hub part displays the image corresponding to the vehicle state information, so that the information can be appropriately transmitted to the occupant.

In the above aspect, preferably, the environment information includes surrounding vehicle information acquired by an external environment recognizing device and indicating a relative positional relationship between the vehicle and a surrounding vehicle present around the vehicle, and the interface control device is configured to cause the display to display a first image (91, 92) indicating the surrounding vehicle information.

According to this aspect, the occupant can recognize the presence and position of the surrounding vehicle by checking the display.

In the above aspect, preferably, the interface control device is configured to change the first image according to driving mode information included in the vehicle state information and including information about an autonomous driving mode and a manual driving mode.

According to this aspect, the display can transmit the information suitable for each driving mode to the occupant. For example, in the manual driving mode, the occupant visually monitors the external environment including the surrounding vehicle, so that it would be better for the display to display the state of the own vehicle than to display the information about the surrounding vehicle.

In the above aspect, preferably, the interface control device makes an area around the vehicle wider in a case of the autonomous driving mode than in a case of the manual driving mode, the area being displayed in the first image.

According to this aspect, in the manual driving mode, the display can display more information about the own vehicle than about the surrounding vehicle.

In the above aspect, preferably, in a case of the manual driving mode, the interface control device determines an acceleration/deceleration state of the vehicle based on the vehicle state information, and changes an own vehicle image corresponding to the vehicle according to the acceleration/deceleration state, the own vehicle image being included in the first image.

According to this aspect, the occupant can recognize the acceleration/deceleration of the vehicle based on the own vehicle image.

In the above aspect, preferably, the interface control device is configured to display a plurality of object images (105) in the own vehicle image, a moving speed of the object images changing according to a vehicle speed.

According to this aspect, the occupant can recognize the acceleration/deceleration of the vehicle based on the own vehicle image.

In the above aspect, preferably, in a case of the autonomous driving mode, the interface control device acquires a prospective trajectory of the vehicle based on the vehicle state information, and causes the display to display a second image (92, 102) indicating the prospective trajectory.

According to this aspect, the occupant can recognize the travel direction of the own vehicle based on the second image displayed on the display.

In the above aspect, preferably, the interface control device is configured to locate the second image above the first image on the display and to laterally move the second image according to the prospective trajectory.

According to this aspect, it is possible to display the second image by using a relatively small space.

In the above aspect, preferably, at least one touch sensor (35 to 37) is provided on the outer edge part, and the interface control device is configured to cause the first light source to emit light according to an operation input detected by the touch sensor.

According to this aspect, in a case where there is no operation input to the touch sensor by the occupant, the first light source provided on the extending part does not emit light. Accordingly, it is possible to prevent the light from the first light source from making the occupant feel annoyed.

In the above aspect, preferably, at least one second light source is provided on the outer edge part, and the interface control device is configured to change light emitting modes of the first light source and the second light source according to the operation input to the touch sensor.

According to this aspect, the first light source and the second light source emit light according to the operation of the occupant, so that the occupant can recognize that his/her operation has been detected by the steering operation element. Further, when the occupant does not operate the touch sensor, the first light source and the second light source do not emit light, so that the occupant is less likely to feel annoyed.

In the above aspect, preferably, the interface control device is configured to determine whether a driving intervention request is generated based on the vehicle state information, the driving intervention request being generated when the autonomous driving mode is changed to the manual driving mode, and the interface control device is configured to vary the light emitting mode of the first light source according to cases including a case where the driving intervention request is generated and the operation input corresponding to a gripping operation on the outer edge part by an occupant is detected and a case where the driving intervention request is not generated and the operation input corresponding to the gripping operation on the outer edge part by the occupant is detected.

According to this aspect, the occupant can recognize that his/her response operation to the driving intervention request has been detected by the steering operation element.

Effect of the Invention

Thus, according to the above aspects, in a steering operation element of a vehicle, it is possible to display information appropriately without making the occupant feel annoyed.

BRIEF DESCRIPTION OF THE DRAWING(S)

Figure 2:
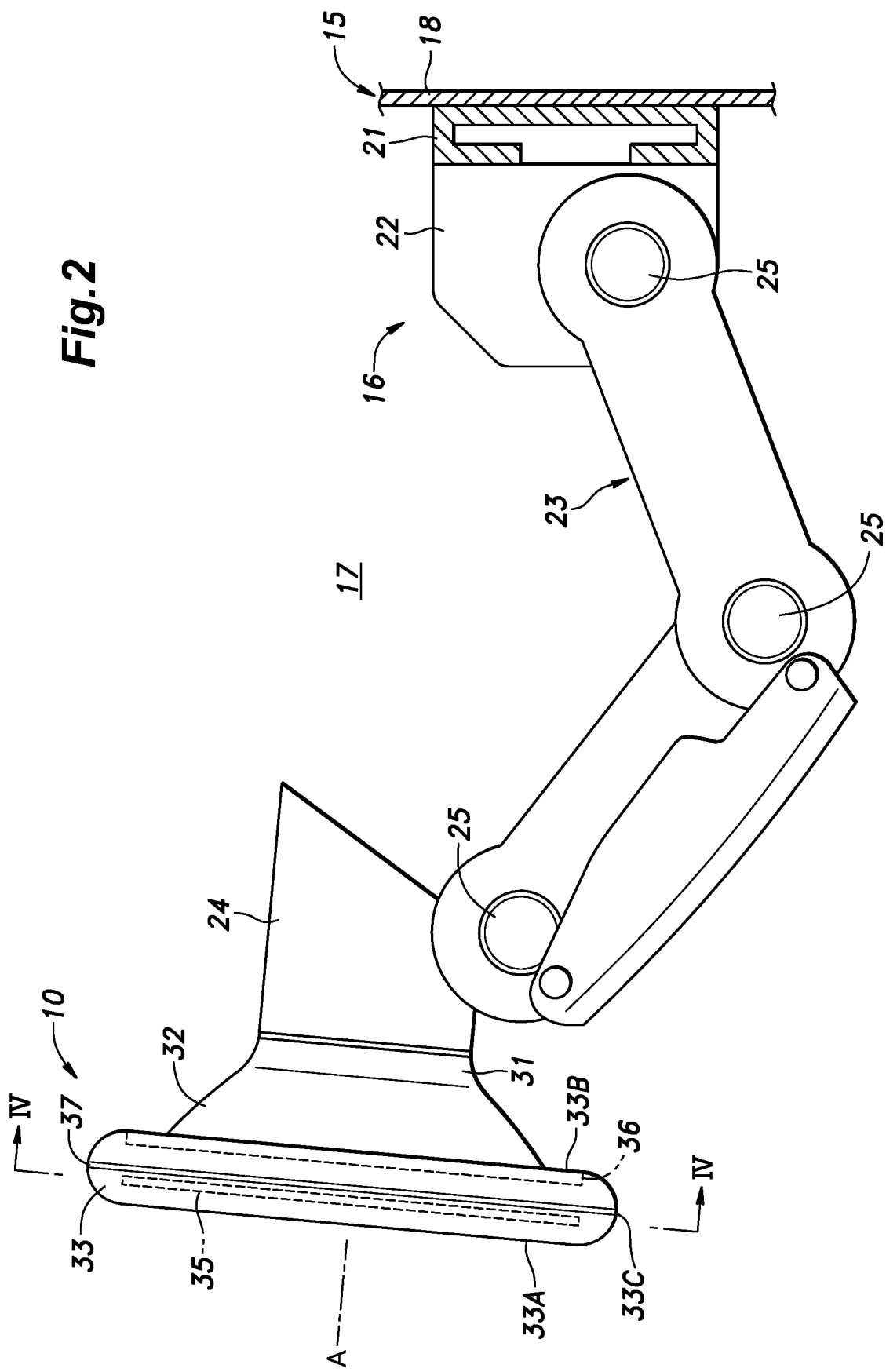
Figure 3:
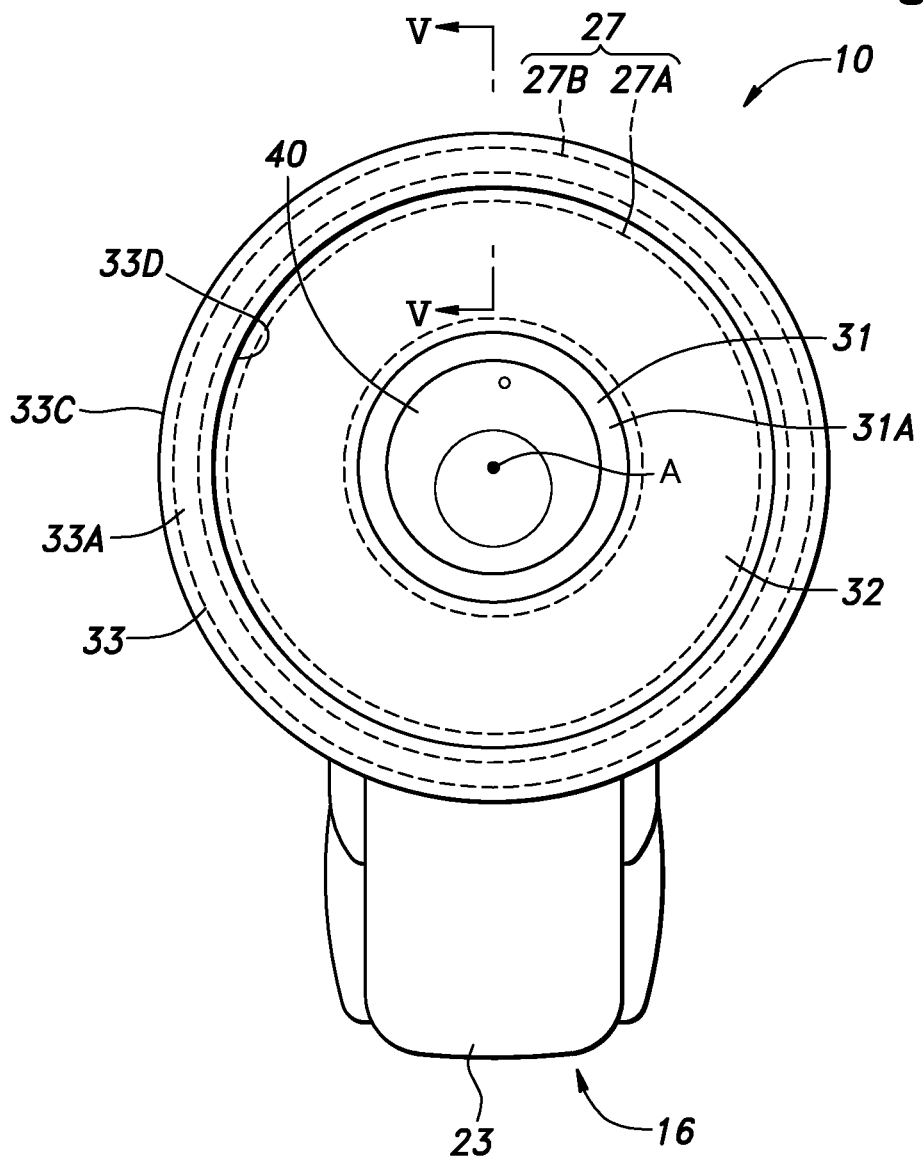
Figure 4:
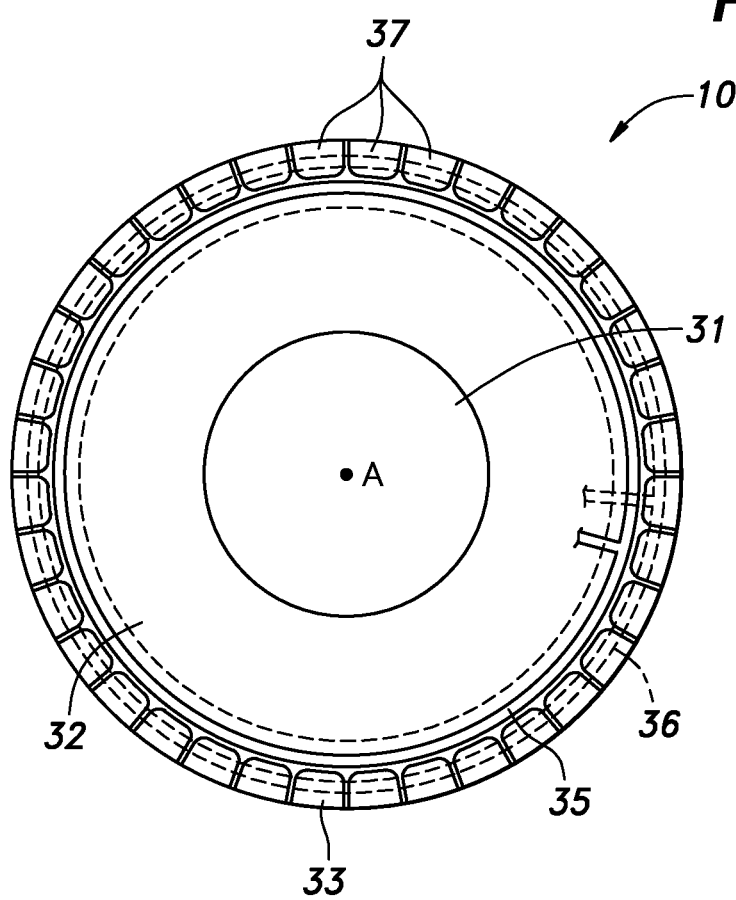
Figure 5:
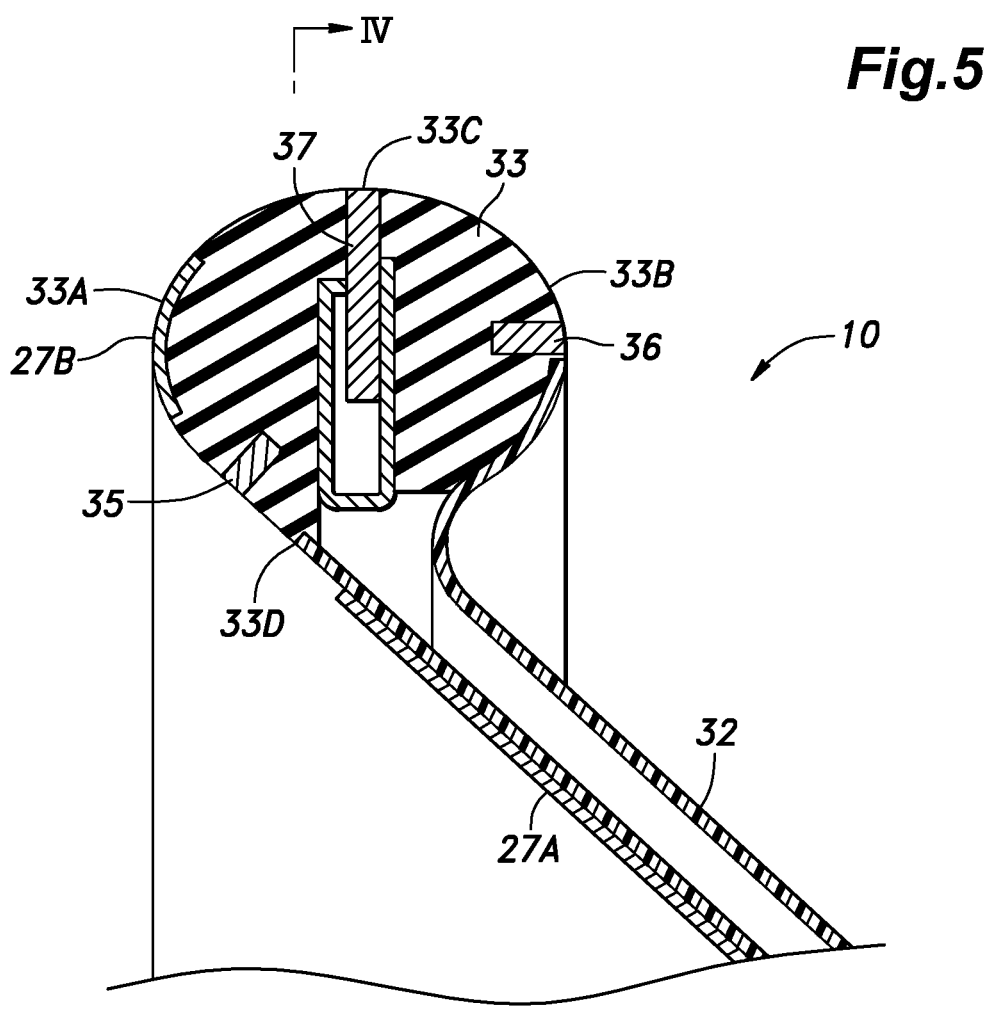
Figure 6A:
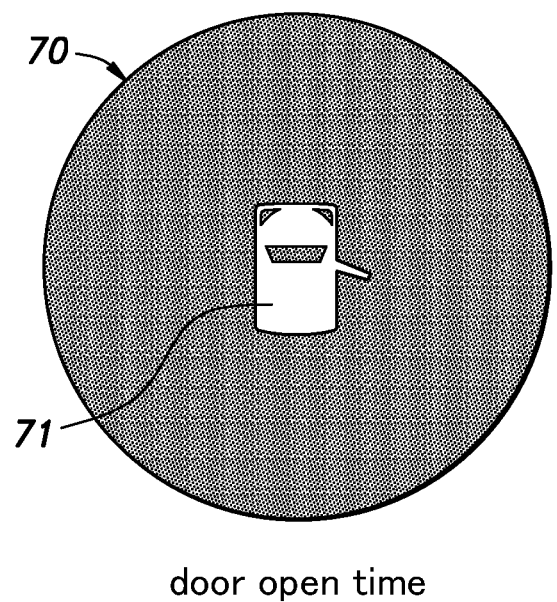
Figure 6B:
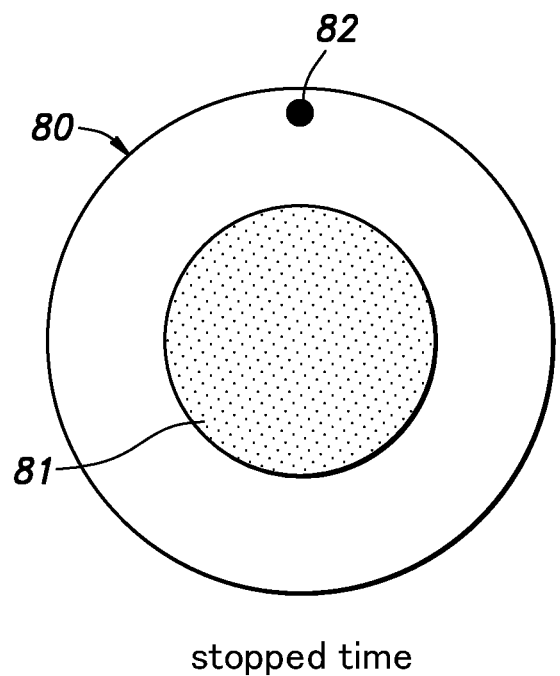
Figure 6C:
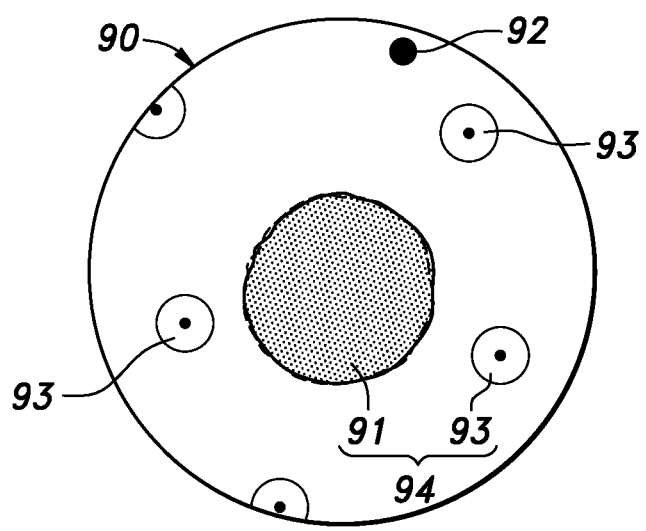
Figure 6D:
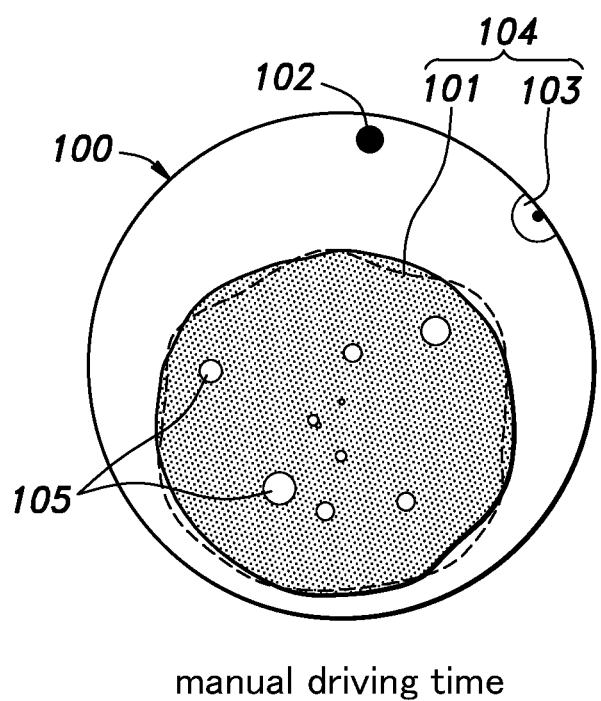
Figure 7A:
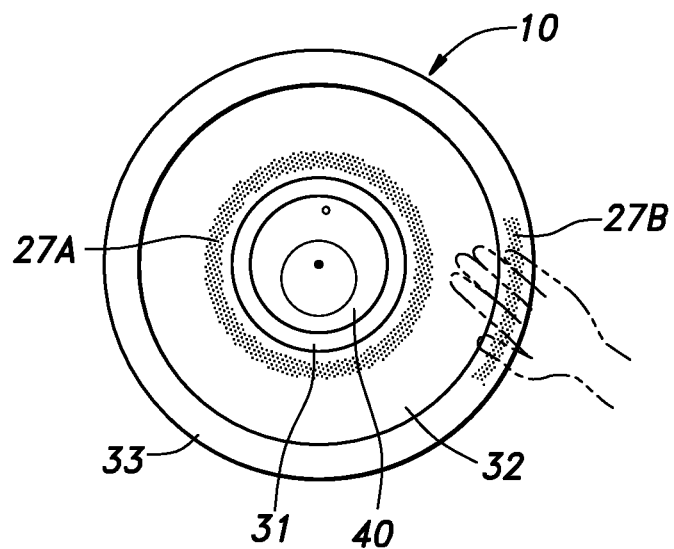
Figure 7B:
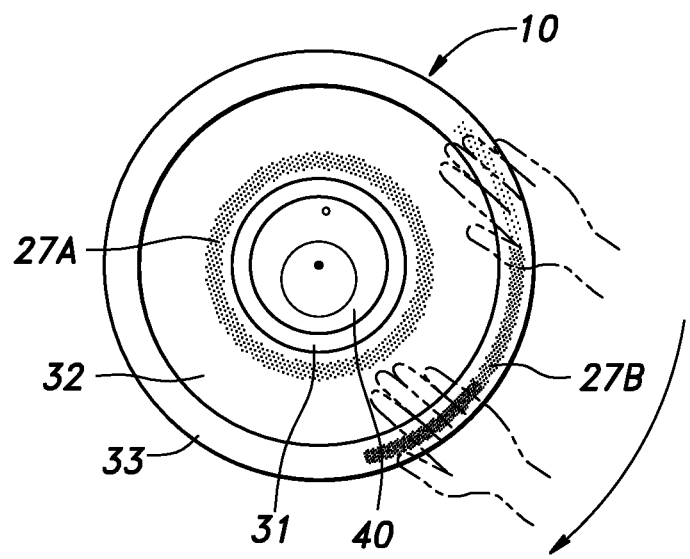
Figure 7C:
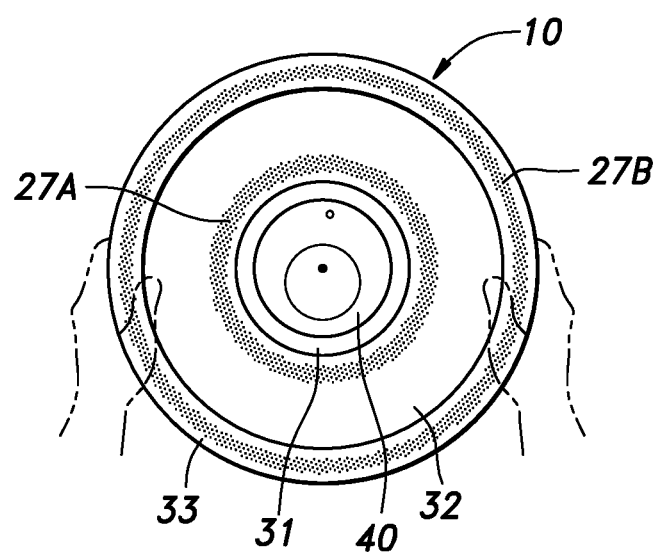

FIG. 1 is a block diagram of a vehicle control system according to an embodiment;
FIG. 2 is a side view of a steering operation element;
FIG. 3 is a rear view of the steering operation element;
FIG. 4 is an exploratory diagram showing positional relationships among first to third capacitive sensors provided in the steering operation element;
FIG. 5 is a sectional view of an outer edge part (ring part) of the steering operation element (a sectional view taken along a line V-V of FIG. 3);
FIG. 6A shows a door open time image displayed on a display;
FIG. 6B shows a stopped time image displayed on the display;
FIG. 6C shows an autonomous driving time image displayed on the display;
FIG. 6D shows a manual driving time image displayed on the display;
FIG. 7A is an exploratory diagram showing a light emitting mode of the steering operation element in response to a single tap operation during autonomous driving;
FIG. 7B is an exploratory diagram showing the light emitting mode of the steering operation element in response to a stroke operation during the autonomous driving; and
FIG. 7C is an explanatory diagram showing the light emitting mode of the steering operation element in response to a gripping operation when the driving intervention request is generated.

MODE(S) FOR CARRYING OUT THE INVENTION

In the following, a vehicle control system according to an embodiment of the present invention will be described with reference to the drawings. As shown in FIG. 1, the vehicle control system 1 is provided in a vehicle 2 which is capable of autonomous driving. The vehicle 2 can travel either in a manual driving mode in which an occupant mainly performs a driving operation or in an autonomous driving mode in which the vehicle 2 mainly performs the driving operation. As shown in FIG. 1, the vehicle 2 includes a steering device 4 configured to steer wheels of the vehicle 2, a driving device 5 configured to rotate the wheels, and a brake device 6 configured to apply the brake to the rotation of the wheels.

The vehicle control system 1 includes a steering operation element 10 provided with various sensors, and a travel control device 11 configured to control at least one of the steering device 4, the driving device 5, and the brake device 6 according to a signal from the steering operation element 10. The steering operation element 10 is a device configured to receive an input operation by the occupant to steer the vehicle 2. The steering operation element 10 may include, for example, a steering wheel or a control stick. An outline of the steering operation element 10 may be formed in a shape such as a circular shape, a rectangular shape, a shape formed by cutting off a part of a circle, or a shape formed by combining left and right arc parts and upper and lower straight-line parts.

As shown in FIG. 2, the steering operation element 10 is rotatably supported by a vehicle body 15 via a supporting device 16. The supporting device 16 constitutes a part of the vehicle body 15. The supporting device 16 includes a rail 21 extending laterally and provided on a dash panel 18 that constitutes a front wall of a vehicle cabin 17 of the vehicle 2, a slider 22 supported by the rail 21, an arm 23 extending rearward from the slider 22, and a base 24 provided at a rear end of the arm 23. The slider 22 is supported by the rail 21 such that the slider 22 can move laterally along the rail 21. The arm 23 includes at least one joint 25, and supports the base 24 such that the base 24 can move in the front-and-rear direction and the up-and-down direction with respect to the slider 22. The arm 23 may include, for example, a plurality of parallel link mechanisms.

As shown in FIGS. 2 and 3, the steering operation element 10 includes a hub part 31 provided rotatably with respect to the base 24 of the arm 23, an extending part 32 extending radially outward from an outer circumference of the hub part 31, an outer edge part 33 provided on an outer edge of the extending part 32. The extending part 32 constitutes a circular disk part provided coaxially with the hub part 31. In the present embodiment, the extending part 32 extends radially outward from the hub part 31 to a side opposite to the base 24 in a direction of a turning axis A of the steering operation element 10 (hub part 31), and is formed in a cone shape with the hub part 31 on the top thereof. Like a punched metal sheet, the extending part 32 may have a plurality of through holes. Preferably, the extending part 32 is made of a resin material or a metal material.

The outer edge part 33 extends along the outer edge of the extending part 32. In the present embodiment, the outer edge part 33 is formed in an annular shape around the turning axis A of the steering operation element 10 (hub part 31), and constitutes a ring part. The outer edge part 33 has a circular cross section. The diameter of the outer edge part 33 in the cross section is larger than the thickness of the extending part 32. The outer edge part 33 functions as a grip part the occupant grips to perform a turning operation on the steering operation element 10. A surface of the outer edge part 33 may be made of a flexible material such as rubber.

As shown in FIG. 1, the steering operation element 10 includes a first capacitive sensor 35, a second capacitive sensor 36, third capacitive sensors 37, a turning angle sensor 38, and a force sensor 39. The turning angle sensor 38 is configured to detect a turning angle of the steering operation element 10 with respect to the vehicle body 15. The turning angle sensor 38 may consist of a rotary encoder, a resolver, or the like. In another embodiment, the steering operation element 10 may include a gyro sensor configured to detect the turning speed of the steering operation element 10. The force sensor 39 may be a known piezoelectric sensor or a known strain gauge sensor, and is provided between the base 24 and the hub part 31.

As shown in FIGS. 2, 4, and 5, the first to third capacitive sensors 35 to 37 are touch sensors configured to detect the approach and contact of an object such as the occupant's finger based on a change in capacitance. The first to third capacitive sensors 35 to 37 are provided on the outer edge part 33 of the steering operation element 10.

The outer edge part 33 includes a facing part 33A facing a side of the occupant and a back part 33B opposite to the facing part 33A. More specifically, in a case where the outer edge part 33 is divided into two portions on a plane including an outer circumferential edge (a part where the outer edge part 33 has the maximum diameter around the turning axis A of the steering operation element 10) and an inner circumferential edge (a part where the outer edge part 33 has the minimum diameter around the turning axis A of the steering operation element 10) of the outer edge part 33, one part arranged on a side of the base 24 is defined as the back part 33B, and the other part arranged on the side opposite to the base 24 is defined as the facing part 33A. The first capacitive sensor 35 is provided on one of the facing part 33A or the back part 33B of the outer edge part 33. The second capacitive sensor 36 is provided on the other of the facing part 33A and the back part 33B of the outer edge part 33. In the present embodiment, the first capacitive sensor 35 is provided on the facing part 33A, and the second capacitive sensor 36 is provided on the back part 33B.

The first capacitive sensor 35 is a single sensor formed in an annular shape and provided coaxially with the outer edge part 33 along the facing part 33A of the outer edge part 33. In another embodiment, a plurality of first capacitive sensors 35 may be arranged in the circumferential direction along the facing part 33A of the outer edge part 33. Preferably, the first capacitive sensor 35 is provided on an inner circumferential side of the facing part 33A. More specifically, when viewed in the direction along the turning axis A of the steering operation element 10, preferably, the first capacitive sensor 35 is provided on a radially inner side with respect to a center circle that passes through a widthwise central part of the outer edge part 33. That is, preferably, the first capacitive sensor 35 is provided on an inner circumferential part 33D of the outer edge part 33.

The second capacitive sensor 36 is a single sensor formed in an annular shape and provided coaxially with the outer edge part 33 along the back part 33B of the outer edge part 33. In another embodiment, a plurality of second capacitive sensors 36 may be arranged in the circumferential direction along the back part 33B of the outer edge part 33. Preferably, the second capacitive sensor 36 extends along a widthwise central part of the back part 33B. Preferably, the second capacitive sensor 36 has a larger diameter than the first capacitive sensor 35.

The third capacitive sensors 37 are arranged in the circumferential direction along an outer circumferential part 33C including the outer circumferential edge of the outer edge part 33. The third capacitive sensors 37 each have the same angular length in the circumferential direction, and are arranged adjacently to each other at equal intervals. Preferably, the gaps between the adjacent third capacitive sensors 37 are as small as possible. In the present embodiment, thirty-six third capacitive sensors 37 each having an angular length of about 10 degrees are provided.

The first to third capacitive sensors 35 to 37 are configured to output signals corresponding to the capacitance thereof. The capacitance of the first to third capacitive sensors 35 to 37 increases as the object approaches the respective sensors 35 to 37, as the size of the approaching object is greater, and as the relative permittivity of the approaching object is higher.

As shown in FIG. 3, at least one light source 27 is provided on at least one of the extending part 32 and the outer edge part 33. In the present embodiment, the light source 27 includes at least one first light source 27A provided on the extending part 32 and at least one second light source 27B provided on the outer edge part 33. The at least one first light source 27A and the at least one second light source 27B may consist of, for example, LEDs. A plurality of first light sources 27A may be uniformly dispersed in a facing part 32A of the extending part 32, arranged radially around the hub part 31, or arranged on a plurality of concentric circles around the hub part 31. The first light sources 27A can cause each part of the extending part 32 to emit light independently. A plurality of second light sources 27B may be arranged in the circumferential direction along the facing part 33A of the outer edge part 33. Alternatively, one second light source 27B may be provided in an annular shape in the circumferential direction along the facing part 33A of the outer edge part 33. The second light sources 27B can cause each circumferential part of the outer edge part 33 to emit light independently.

As shown in FIG. 2, a display 40 is provided on the side of a facing part 31A (the side of the occupant) of the hub part 31. The display 40 consists of, for example, a liquid crystal display or an organic EL display, and can display a color image. The display 40 is formed in a circular shape and occupies 50% or more of the area of the facing part 31A of the hub part 31.

The travel control device 11 is connected to a vehicle sensor 45 configured to detect various state quantities of the vehicle 2 and an external environment recognizing device 46 configured to detect environmental information around the vehicle 2. The vehicle sensor 45 includes, for example, a vehicle speed sensor configured to detect the vehicle speed of the vehicle 2, an acceleration sensor configured to detect the acceleration of the vehicle 2, a yaw rate sensor configured to detect the yaw rate of the vehicle 2, and a door open/close sensor configured to detect an opened/closed state of the door. The travel control device 11 is configured to acquire the various state quantities of the vehicle 2 from the vehicle sensor 45.

The external environment recognizing device 46 is configured to acquire surrounding vehicle information and surrounding environment information, thereby outputting the surrounding vehicle information and the surrounding environment information to the travel control device 11. The external environment recognizing device 46 includes a camera 47 configured to capture an image around the own vehicle 2, an object detection sensor 48 such as a laser or a lidar configured to detect an object present around the own vehicle 2, and a navigation device 49. The external environment recognizing device 46 is configured to acquire lane markings on a road and lanes based on the image captured by the camera 47 and to acquire the surrounding vehicle information, which includes information about the position and speed of a surrounding vehicle traveling around the own vehicle 2, based on the image captured by the camera 47 and a detection signal of the object detection sensor 48. Also, the external environment recognizing device 46 is configured to acquire the surrounding environment information, which includes information about one lane where the vehicle is traveling, another lane adjacent to the one lane, and branch roads around the vehicle 2, based on the position of the own vehicle 2 and map information from the navigation device 49.

In first operation control, the travel control device 11 controls the steering device 4 based on a signal from the turning angle sensor 38, and controls the driving device 5 and the brake device 6 according to a pushing/pulling operation on the steering operation element 10 and a touching operation on the first to third capacitive sensors 35 to 37. The travel control device 11 detects the movement of the steering operation element 10 based on, for example, a signal from the force sensor 39. The movement of the steering operation element 10 detected by the travel control device 11 includes the movement toward the pushing side (the side away from the occupant) and toward the pulling side (the side closer to the occupant) along the turning axis A. When the steering operation element 10 is operated toward the pulling side, the travel control device 11 may control the driving device 5 and the brake device 6 to decelerate the vehicle 2. When the steering operation element 10 is operated toward the pushing side, the travel control device 11 may control the driving device 5 to accelerate the vehicle 2. Accordingly, the occupant can steer the vehicle 2 by turning the steering operation element 10, accelerate the vehicle 2 by performing a pushing operation on the steering operation element 10, and decelerate the vehicle 2 by performing a pulling operation on the steering operation element 10. Further, in the first operation control, the travel control device 11 may control the steering device 4 based on the signal from the turning angle sensor 38, control the driving device 5 based on a signal from an accelerator pedal 52, and control the driving device 5 and the brake device 6 based on a signal from a brake pedal 53. Further, the accelerator pedal 52 and the brake pedal 53 may be unified into one member, and a signal corresponding to acceleration may be output when the above member is pressed and a signal corresponding to deceleration may be output when the pressing of the above member is released.

The travel control device 11 executes a first operation mode to control the steering device 4 according to the signal from the turning angle sensor 38 that detects the turning angle of the steering operation element 10 and a second operation mode to control the steering device 4 according to a signal from at least one of the first to third capacitive sensors 35 to 37. The travel control device 11 may change the operation mode between the first operation mode and the second operation mode according to the driving mode of the vehicle 2. The travel control device 11 may execute the first operation mode during the manual driving mode and execute the second operation mode during the autonomous driving mode.

In the first operation mode, the travel control device 11 controls the steering device 4 according to the turning operation on the steering operation element 10 by the occupant, and changes a steering angle of the wheels. In the second operation mode, the travel control device 11 controls at least one of the steering device 4 and the driving device 5 according to the touching operation on the first to third capacitive sensors 35 to 37 by the occupant.

The first capacitive sensor 35 and the second capacitive sensor 36 output signals corresponding to the capacitance to the travel control device 11. The travel control device 11 controls at least one of the driving device 5 and the brake device 6 according to the signals output from the first capacitive sensor 35 and the second capacitive sensor 36. For example, in the second operation mode corresponding to the autonomous driving mode, the travel control device 11 may control at least one of the driving device 5 and the brake device 6 according to the signals output from the first capacitive sensor 35 and the second capacitive sensor 36. In the present embodiment, the travel control device 11 executes acceleration control upon receiving a prescribed signal from the first capacitive sensor 35. In the acceleration control, the travel control device 11 controls the driving device 5 to accelerate the vehicle 2. The travel control device 11 executes deceleration control upon receiving a prescribed signal from the second capacitive sensor 36. In the deceleration control, the travel control device 11 controls at least one of the driving device 5 and the brake device 6 to decelerate the vehicle 2. The acceleration control includes the control to increase a target vehicle speed from a current value by a prescribed value and the control to shorten the target inter-vehicle distance (distance between the own vehicle 2 and a preceding vehicle traveling in front of the own vehicle 2) from a current value by a prescribed value. The deceleration control includes the control to decrease the target vehicle speed from the current value by the prescribed value and the control to lengthen the target inter-vehicle distance from the current value by the prescribed value.

In a case where the occupant performs a prescribed operation on the first capacitive sensor 35, the first capacitive sensor 35 outputs a prescribed signal to the travel control device 11. The prescribed operation the occupant performs on the first capacitive sensor 35 may be an operation that generates a change in prescribed capacitance, such as a single tap operation, a double tap operation, or a long press operation. In the present embodiment, the travel control device 11 executes the acceleration control upon detecting a change in the capacitance of the first capacitive sensor 35 corresponding to the single tap operation on the first capacitive sensor 35 by the occupant.

In a case where the occupant performs a prescribed operation on the second capacitive sensor 36, the second capacitive sensor 36 outputs a prescribed signal to the travel control device 11. The prescribed operation the occupant performs on the second capacitive sensor 36 may be an operation that generates a change in prescribed capacitance, such as a single tap operation, a double tap operation, or a long press operation. In the present embodiment, the travel control device 11 executes the deceleration control upon detecting a change in the capacitance of the second capacitive sensor 36 corresponding to the single tap operation on the second capacitive sensor 36 by the occupant.

Further, when the vehicle 2 is stopped, the travel control device 11 may execute travel start control according to a signal received from at least one of the first to third capacitive sensors 35 to 37. In the travel start control, the travel control device 11 controls the driving device 5 to start the traveling of the vehicle 2. Further, when the vehicle 2 is traveling, the travel control device 11 may execute stop control according to a signal received from at least one of the first to third capacitive sensors 35 to 37. In the stop control, the travel control device 11 controls at least one of the driving device 5 and the brake device 6 to stop the traveling of the vehicle 2. The travel control device 11 may acquire the vehicle speed by using the vehicle sensor 45, and may determine that the vehicle 2 is stopped when the vehicle speed is 0 or when the vehicle speed is equal to or less than a prescribed value. For example, when the vehicle speed is equal to or less than the prescribed value and the third capacitive sensors 37 arranged in a specific circumferential area detect the change in the capacitance corresponding to the single tap operation, the travel control device 11 may execute the travel start control, thereby controlling the driving device 5 to start the traveling of the vehicle 2. Further, for example, when the vehicle speed is greater than the prescribed value and the third capacitive sensors 37 arranged in the specific circumferential area detect the change in the capacitance corresponding to the single tap operation, the travel control device 11 may execute the stop control, thereby stopping the vehicle 2.

Further, the travel control device 11 detects the moving direction (a clockwise direction along the circumferential direction of the outer edge part 33 or a counterclockwise direction opposite to the clockwise direction) of the object including the occupant's hand in contact with the outer edge part 33 based on the signals from the third capacitive sensors 37. The travel control device 11 executes steering control to control the steering device 4 based on the moving direction of the object. When the object moves in the circumferential direction on the outer circumferential part 33C of the outer edge part 33, the capacitance of the third capacitive sensors 37 arranged in the circumferential direction increases and then decreases in order. Accordingly, the travel control device 11 can detect the circumferential movement of the object with respect to the outer edge part 33 by detecting the change in the capacitance of the third capacitive sensors 37. Thus, by using the third capacitive sensors 37, the travel control device 11 can detect a stroke operation on the outer circumferential part 33C of the outer edge part 33 by the occupant. The changing order of the capacitance of the third capacitive sensors 37 varies depending on the clockwise stroke operation or the counterclockwise stroke operation on the outer edge part 33. Accordingly, the travel control device 11 can distinguish and recognize the clockwise stroke operation and the counterclockwise stroke operation by the occupant. Further, the travel control device 11 can identify a portion (area) of the outer edge part 33 on which the stroke operation by the occupant is performed based on the signals from the third capacitive sensors 37. The travel control device 11 may execute the steering control when the stroke operation is performed by the occupant on a specific portion of the outer edge part 33.

As shown in FIG. 1, the display 40, the first light sources 27A, and the second light sources 27B are controlled by an interface control device 41. The interface control device 41 causes the display 40 to display an image corresponding to at least one of vehicle state information indicating a state of the vehicle 2 and environment information indicating a surrounding environment of the vehicle 2. The interface control device 41 causes the first light sources 27A and the second light sources 27B to emit light according to the operation input by the occupant detected by the first to third capacitive sensors 35 to 37. The vehicle state information includes at least one of the driving mode (the autonomous driving mode or the manual driving mode) of the vehicle 2, the travel direction or prospective trajectory of the vehicle 2, the vehicle speed of the vehicle 2, and the steering angle of the vehicle 2. The environment information at least includes a relative positional relationship between the vehicle 2 and the surrounding vehicle present around the vehicle 2, and may include the speed of the surrounding vehicle, relative speed of the vehicle 2 and the surrounding vehicle. The interface control device 41 acquires the vehicle state information and the environment information from the travel control device 11, the external environment recognizing device 46 which will be described later, and the vehicle sensor 45. The interface control device 41 may acquire information directly from the external environment recognizing device 46 and the vehicle sensor 45, or may acquire information from the external environment recognizing device 46 and the vehicle sensor 45 via the travel control device 11. Further, the interface control device 41 is configured to control the light emitting modes of the first light sources 27A and the second light sources 27B based on the signals from the first to third capacitive sensors 35 to 37 and the travel control device 11. The signals from the first to third capacitive sensors 35 to 37 may be directly input to the interface control device 41, or may be input to the interface control device 41 via the travel control device 11.

Next, the image which the interface control device 41 causes the display 40 to display will be described. As shown in FIGS. 6A to 6D, the image displayed on the display 40 changes according to vehicle states such as a door open state, a stopped state (a standby state), an autonomous driving state, and a manual driving state.

The interface control device 41 acquires via the travel control device 11 a signal from the door open/close sensor included in the vehicle sensor 45, and causes the display 40 to display a door open time image 70 shown in FIG. 6A upon determining that the door of the vehicle 2 is open. The door open time image 70 may be any preset image. The door open time image 70 according to the present embodiment includes a black background and a white emblem 71 arranged in the center of the display 40.

The interface control device 41 acquires via the travel control device 11 a signal from the vehicle speed sensor included in the vehicle sensor 45, a signal related to an operating state of a parking brake device, and a signal related to a power on/off state of the vehicle 2, and causes the display 40 to display a stopped time image 80 shown in FIG. 6B upon determining based on these signals that the power of the vehicle 2 is on and the vehicle 2 is in a stopped state. The stopped time image 80 includes an own vehicle image 81 displaying the own vehicle 2 in the center of the display 40 and a travel direction image 82 (second image) displayed near an upper edge of the display 40 and above the own vehicle image 81 and corresponding to the travel direction of the vehicle 2. The own vehicle image 81 is an image that abstractly displays the own vehicle 2, and is drawn as a gray circle. The own vehicle image 81 of the stopped time image 80 has a constant shape to make the occupant recognize that the own vehicle 2 is stopped and is shown in a color (for example, gray) that gives an inert impression. The travel direction image 82 of the stopped time image 80 consists of a circular point. The travel direction image 82 of the stopped time image 80 is displayed in a neutral position, which is a central position in the lateral direction, since the own vehicle 2 is not traveling.

The interface control device 41 acquires the driving mode from the travel control device 11, and causes the display 40 to display an autonomous driving time image 90 shown in FIG. 6C upon determining that the driving mode is the autonomous driving mode. The autonomous driving time image 90 includes an own vehicle image 91 displaying the own vehicle 2 in the center of the display 40, a travel direction image 92 (second image) displayed near the upper edge of the display 40 and above the own vehicle image 91 and corresponding to the travel direction of the vehicle 2, and one or more obstacle images 93 corresponding to one or more obstacles present around the own vehicle 2. The obstacles include a surrounding vehicle, a person, a falling object, or the like, which/who is present around the own vehicle. The own vehicle image 91 and each obstacle image 93 form a relative position image 94 (first image) indicating a relative positional relationship between the vehicle 2 and the surrounding vehicle present around the vehicle 2. The relative position image 94 is a plan view showing an area around the vehicle 2.

The own vehicle image 91 of the autonomous driving time image 90 is drawn in a substantially circular shape. A circumferential edge of the own vehicle image 91 may waver as the liquid flows to make the occupant recognize that the vehicle 2 is traveling. Further, the own vehicle image 91 may be shown in a color different from the color of the own vehicle image 81 of the stopped time image 80 to make the occupant recognize that the vehicle 2 is traveling, and may be shown in a color that gives an active impression (for example, blue). The own vehicle image 91 may move downward according to acceleration, move upward according to deceleration, move to the left according to a right turn, and move to the right according to a left turn. The occupant can recognize an acceleration/deceleration state and a turning state of the vehicle 2 based on the movement of the own vehicle image 91.

The travel direction image 92 of the autonomous driving time image 90 is a circular point. The interface control device 41 laterally moves the travel direction image 92 along the circumferential direction around the display 40 according to the prospective trajectory of the vehicle 2 acquired from the travel control device 11. For example, in a case where the prospective trajectory of the vehicle 2 turns to the right, the travel direction image 92 may move to the right of a neutral position arranged above the center of the display 40. The lateral moving amount of the travel direction image 92 may correspond to the turning amount of the prospective trajectory of the vehicle 2.

Each obstacle image 93 of the autonomous driving time image 90 includes a circular point and a circle surrounding the point. The interface control device 41 acquires the surrounding vehicle information acquired by the external environment recognizing device 46 via the travel control device 11, and displays the obstacle image 93 corresponding to each surrounding vehicle around the own vehicle image 91.

The interface control device 41 acquires the driving mode from the travel control device 11 and causes the display 40 to display a manual driving time image 100 shown in FIG. 6D upon determining that the driving mode is the manual driving mode. The manual driving time image 100 includes an own vehicle image 101 displaying the own vehicle 2 in the center of the display 40, a travel direction image 102 (second image) displayed near the upper edge of the display 40 and above the own vehicle image 101 and corresponding to the travel direction of the vehicle 2, and one or more obstacle images 103 corresponding to one or more obstacles present around the own vehicle 2. The own vehicle image 101 and each obstacle image 103 form a relative position image 104 (first image) indicating a relative positional relationship between the vehicle 2 and the surrounding vehicle present around the vehicle 2.

The own vehicle image 101 of the manual driving time image 100 is drawn in a substantially circular shape. A circumferential edge of the own vehicle image 101 may waver as the liquid flows to make the occupant recognize that the vehicle 2 is traveling. Preferably, the waver (change) in the circumferential edge of the own vehicle image 101 of the manual driving time image 100 is greater than the waver (change) in the circumferential edge of the own vehicle image 91 of the autonomous driving time image 90. Further, the own vehicle image 101 of the manual driving time image 100 is larger than the own vehicle image 91 of the autonomous driving time image 90. Namely, the interface control device 41 makes an area around the own vehicle 2 wider in a case of the autonomous driving mode than in a case of the manual driving mode.

The interface control device 41 may change the color of the own vehicle image 101 according to whether the vehicle 2 is accelerating or decelerating. Namely, in a case of the manual driving mode, the interface control device 41 determines the acceleration/deceleration state of the vehicle 2 based on the vehicle state information, and changes the own vehicle image 101 corresponding to the vehicle 2 according to the acceleration/deceleration state. For example, the own vehicle image 101 may be colored blue when the vehicle 2 is accelerating, and may be colored red when the vehicle 2 is decelerating. The own vehicle image 101 may move downward according to acceleration, move upward according to deceleration, move to the left according to a right turn, and move to the right according to a left turn. The interface control device 41 may determine the acceleration/deceleration state of the vehicle 2 based on the vehicle speed, acceleration, or deceleration acquired by the vehicle sensor 45 or the signal from the accelerator pedal 52 or the brake pedal 53.

The interface control device 41 displays a plurality of object images 105 in the own vehicle image 101 such that the moving speed of the object images 105 changes according to the vehicle speed. In the present embodiment, each object image 105 has a substantially circular shape reminding the occupant of a bubble, and moves radially from the center of the own vehicle image 101. At this time, the diameter of the object image 105 increases as the object image 105 moves. Accordingly, for the occupant, the object image 105 looks as if it comes from the back side to the front side of the display 40. The object image 105 may swing horizontally and vertically when moving. Further, the interface control device 41 may increase the number of object images 105 and the moving speed thereof as the vehicle speed increases. The interface control device 41 may acquire via the travel control device 11 the vehicle speed detected by the vehicle speed sensor included in the vehicle sensor 45.

The travel direction image 102 of the manual driving time image 100 is a circular point. The interface control device 41 acquires from the travel control device 11 the turning angle of the steering operation element 10 based on the signal from the turning angle sensor 38, and laterally moves the travel direction image 102 along the circumferential direction around the display 40 according to the turning angle of the steering operation element 10.

The obstacle images 103 of the manual driving time image 100 are the same as the obstacle images 93 of the autonomous driving time image 90. The own vehicle image 101 and each obstacle image 103 form a relative position image 104 indicating a relative positional relationship between the vehicle 2 and the surrounding vehicle present around the vehicle 2. In another embodiment, the obstacle images 103 may not be shown in the manual driving time image 100.

As described above, the interface control device 41 changes the image displayed on the display 40 according to the vehicle states such as the door open state, the stopped state, the autonomous driving state, and the manual driving state. The interface control device 41 changes the relative position image 94, 104 including the own vehicle image 91, 101 and the obstacle images 93, 103 according to the driving mode information included in the vehicle state information and including information about the autonomous driving mode and the manual driving mode.

The interface control device 41 is configured to control the first light sources 27A and the second light sources 27B based on the signals from the first to third capacitive sensors 35 to 37. As shown in FIG. 7A, the interface control device 41 identifies the area of the outer edge part 33 on which the touching operation by the occupant is performed based on the signals from the first to third capacitive sensors 35 to 37, and causes the second light sources 27B in the area of the outer edge part 33 on which the touching operation has been performed to emit light. The touching operation by the occupant may be, for example, a single tap operation, a double tap operation, or a long press operation. The interface control device 41 can identify the area on which the touching operation has been performed based on the signals from the third capacitive sensors 37. As shown in FIG. 7B, in a case where the touching operation by the occupant is the stroke operation on the outer edge part 33, the interface control device 41 may cause the second light sources 27B corresponding to the area on which the stroke operation has been performed to emit light in order in the moving direction of the occupant's hand based on the signals from the third capacitive sensors 37.

Further, as shown in FIG. 7A, the interface control device 41 causes the plurality of first light sources 27A to emit light upon detecting the touching operation on the outer edge part 33 by the occupant based on the signals from the first to third capacitive sensors 35 to 37. At this time, the interface control device 41 at least causes one or more first light sources 27A arranged in the inner circumferential part of the extending part 32 to emit light. Further, as shown in FIG. 7B, the interface control device 41 may cause one or more first light sources 27A to emit light upon detecting the stroke operation on the outer edge part 33 by the occupant. The one or more first light sources are arranged in the inner circumferential part of the extending part 32, and correspond to the area on which the stroke operation has been performed in the radial direction. By causing the first light sources 27A to emit light according to the touching operation on the outer edge part 33 by the occupant, the occupant can understand that his/her touching operation has been transmitted to the vehicle 2.

The travel control device 11 generates a driving intervention request (handover request) when the autonomous driving mode is switched to the manual driving mode. For example, the driving intervention request may be notified to the occupant by a voice or a warning sound from a speaker or by indication on the display 40. In response to the driving intervention request, the driver is required to express his/her acceptance intention by gripping the outer edge part 33 of the steering operation element 10 with both hands. As shown in FIG. 7C, the interface control device 41 determines whether the driving intervention request is generated based on the driving intervention request acquired from the travel control device 11. When the driving intervention request is generated, the interface control device 41 causes all the second light sources 27B of the outer edge part 33 to emit light and causes the first light sources 27A to emit light upon detecting that the occupant grips the outer edge part 33 with both hands based on the signals from the first to third capacitive sensors 35 to 37. At this time, all the first light sources 27A may emit light, or a part of the first light sources 27A arranged in the inner circumferential part of the extending part 32 may emit light. The interface control device 41 may determine that the gripping operation on the outer edge part 33 by the occupant has been performed when the capacitance of left and right third capacitive sensors 37 corresponding to the width of the palm increases. When the gripping operation is detected, all the second light sources 27B emit light annularly, which allows the occupant to understand that his/her acceptance response to the driving intervention request has been transmitted to the vehicle 2.

In a case where the interface control device 41 determines that the driving intervention request is not generated based on the driving intervention request acquired from the travel control device 11, the interface control device 41 causes the second light sources 27B corresponding to the area of the outer edge part 33 gripped by the occupant to emit light and the first light sources 27A to emit light upon detecting that the occupant grips the outer edge part 33 with both hands based on the signals from the first to third capacitive sensors 35 to 37. In this way, the interface control device 41 varies the light emitting mode of the second light sources 27B according to the gripping operation on the outer edge part 33 by the occupant depending on the presence or absence of the driving intervention request.

The steering operation element 10 according to the above embodiment can prevent the light from the first light sources 27A and the second light sources 27B from making the occupant feel annoyed since the first light sources 27A and the second light sources 27B do not emit light in a case where the operation input on the touch sensor by the occupant is not present. Further, the display 40 provided in the hub part 31 displays an image corresponding to the vehicle state information, so that the information can be appropriately transmitted to the occupant.

At the autonomous driving time and manual driving time, the display 40 displays the relative position image 94, 104 indicating the relative positional relationship between the own vehicle 2 and the surrounding vehicle. Accordingly, the occupant can recognize the presence and position of the surrounding vehicle by checking the display 40. Further, the own vehicle image 91 indicating the own vehicle 2 at the autonomous driving is different from the own vehicle image 101 indicating the own vehicle 2 at the manual driving, so that the occupant can recognize the current driving mode based on the own vehicle image 91, 101. Further, the occupant can recognize the acceleration/deceleration state of the vehicle 2 based on the color of the own vehicle image 101. Further, the occupant can recognize the speed of the vehicle 2 based on the object images 105 displayed on the own vehicle image 101. Further, the occupant can recognize the travel direction of the own vehicle 2 based on the travel direction image 92, 102 displayed on the display 40.

The first light sources 27A and the second light sources 27B emit light according to the operation by the occupant, so that the occupant can recognize that his/her operation has been transmitted to the vehicle 2.

Concrete embodiments of the present invention have been described in the foregoing, but the present invention should not be limited by the foregoing embodiments and various modifications and alterations are possible within the scope of the present invention. For example, each image displayed on the display 40 is an example, and the shape, movement, color, size, and position thereof may be changed as appropriate.

Glossary of Terms

1: vehicle control system
2: vehicle
10: steering operation element
11: travel control device
27: light source
27A: first light sources
27B: second light sources
31: hub part
31A: facing part
32: extending part
35: first capacitive sensor
36: second capacitive sensor
37: third capacitive sensors
38: rotation angle sensor
40: display
41: interface control device
45: vehicle sensor
46: external environment recognizing device
70: door open time image
80: stopped time image
81, 91, 101: own vehicle image
82, 92, 102: travel direction image
90: autonomous driving time image
93, 103: obstacle image
94, 104: relative position image
100: manual driving time image
105: object image
A: turning axis

The invention claimed is:

1. A steering wheel of a vehicle, comprising:
a hub part provided rotatably with respect to a vehicle body;
an extending part extending radially outward from an outer circumference of the hub part;
an outer edge part provided on an outer edge of the extending part;
a display provided on the hub part;
at least one first light source provided on the extending part; and
an interface control device configured to control the display and the first light source,
wherein the interface control device is configured to cause the display to display an image corresponding to at least one of vehicle state information indicating a state of the vehicle and environment information indicating a surrounding environment of the vehicle,
the environment information includes surrounding vehicle information acquired by an external environment recognizing device and indicating a relative positional relationship between the vehicle and a surrounding vehicle present around the vehicle,
the interface control device is configured to cause the display to display a first image indicating the surrounding vehicle information,
the interface control device is configured to change the first image according to driving mode information included in the vehicle state information and including information about an autonomous driving mode and a manual driving mode,
the steering wheel further comprises at least one touch sensor provided on the outer edge part,
the interface control device is configured to cause the first light source to emit light according to an operation input detected by the touch sensor, the interface control device is configured to determine whether a driving intervention request is generated based on the vehicle state information, the driving intervention request being generated when the autonomous driving mode is changed to the manual driving mode, and
the interface control device is configured to vary a light emitting mode of the first light source according to cases including a case where the driving intervention request is generated and the operation input corresponding to a gripping operation on the outer edge part by an occupant is detected and a case where the driving intervention request is not generated and the operation input corresponding to the gripping operation on the outer edge part by the occupant is detected.

* * * * *